March 24, 1953 — A. FRIEDMAN — 2,632,453
DEFROSTING TANK FOR CONFECTION MOLDS
Filed June 21, 1946 — 2 SHEETS—SHEET 1
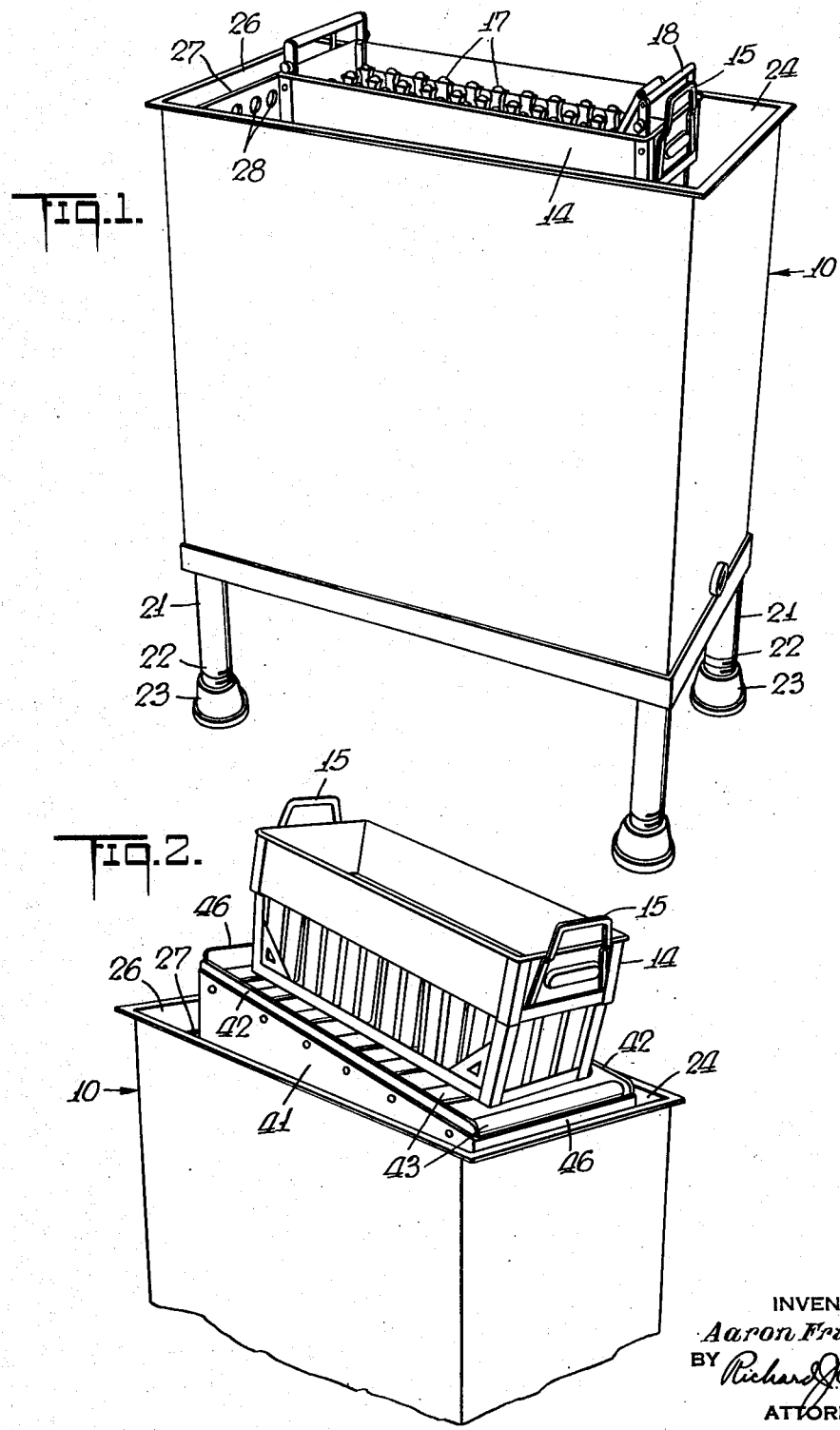
INVENTOR
Aaron Friedman
BY Richard J. Newling
ATTORNEY March 24, 1953 — A. FRIEDMAN — 2,632,453
DEFROSTING TANK FOR CONFECTION MOLDS
Filed June 21, 1946 — 2 SHEETS—SHEET 2
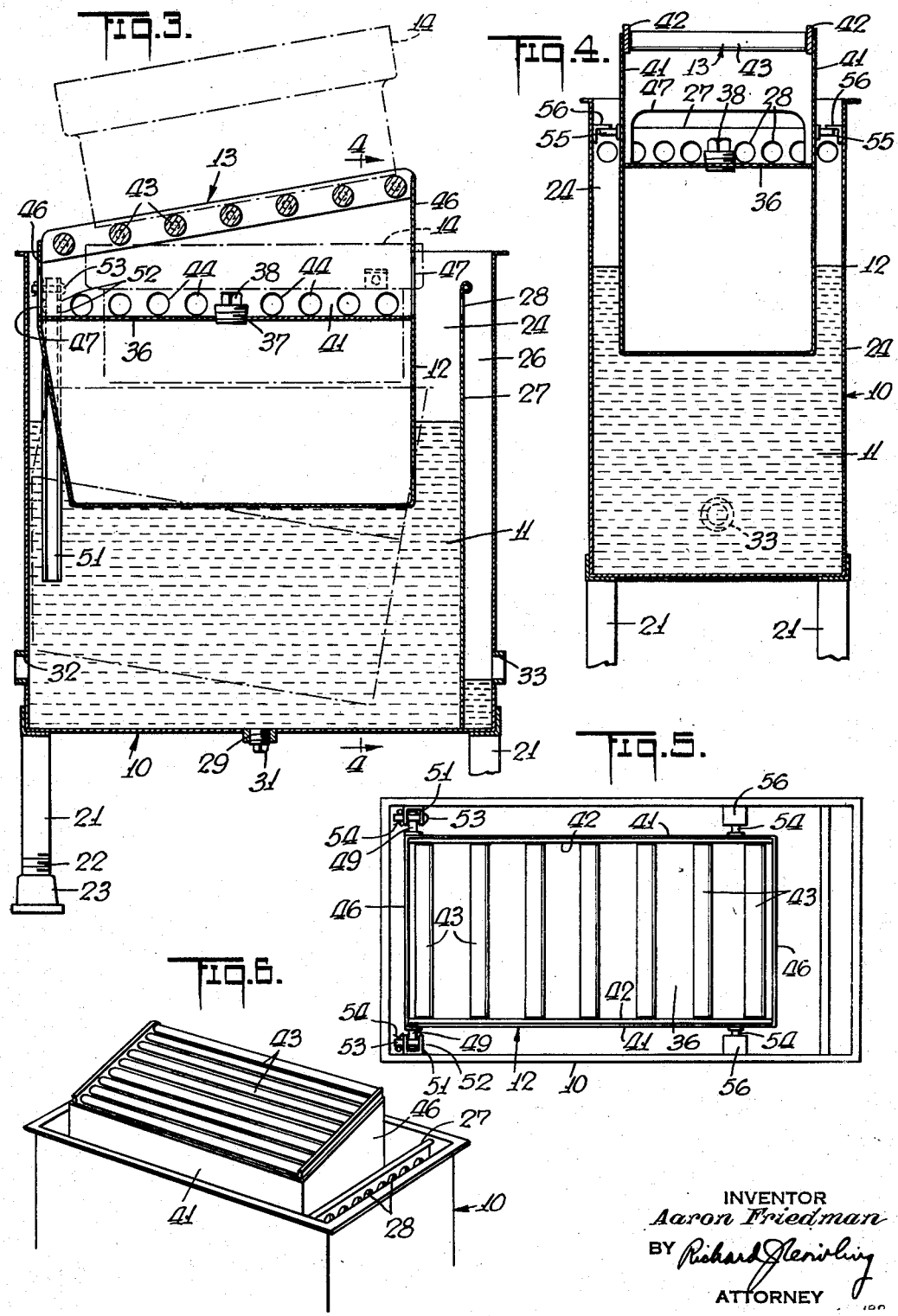
INVENTOR
Aaron Friedman
BY Richard Sterling
ATTORNEY Patented Mar. 24, 1953

2,632,453

UNITED STATES PATENT OFFICE 2,632,453

DEFROSTING TANK FOR CONFECTION MOLDS

Aaron Friedman, New York, N. Y., assignor to Joe Lowe Corporation, New York, N. Y., a corporation of Delaware Application June 21, 1946, Serial No. 678,521

6 Claims. (Cl. 134—154)

The present invention relates to improvements in defrosting apparatus which are widely used in the frozen confectionery industry for releasing frozen confectionery products from the molds in which they are frozen, and it has specific relation to a stationary defrosting tank containing a liquid and having an inner floating tank provided with an inclined platform for supporting a mold above the liquid level in an inclined position, whereby the same will be discharged automatically from the apparatus when the confections are removed and the mold is released from the control of the operator.

One of the objects of the present invention is to provide an improved defrosting tank which will facilitate the defrosting of frozen confections from their molds with a minimum of time and effort on the part of the operator, thereby increasing his production capacity.

Another object of the invention is the provision of a defrosting tank that will materially reduce the amount of time the mold is maintained submerged or in direct contact with the defrosting liquid, thereby preventing undue and unnecessary heating of the mold from the time it is removed from the refrigerating tank until it is again re-inserted with another charge of unfrozen confectionery products.

A further object of the invention is to provide a defrosting tank that will immerse or submerge the mold horizontally in the defrosting liquid with a minimum of pressure, and which will automatically raise the empty mold out of the defrosting liquid and discharge the same from the apparatus, thereby maintaining the apparatus in readiness at all times for the reception of another mold requiring defrosting.

Other and further objects and advantages of the apparatus, which result in simplicity, economy and efficiency, will be apparent from the following description, wherein preferred embodiments of the invention are shown, reference being had to the accompanying drawings, forming a part hereof, wherein like numerals indicate like parts, in which—

Figure 1 is a perspective view of one form of apparatus made in accordance with the principles of the invention, showing a filled frozen confectionery mold positioned therein and in its submerged or defrosting position;

Figure 2 is another perspective view of the apparatus shown in Figure 1, showing the empty mold in its raised position above the level of the defrosting liquid and about to be discharged by gravity from the inclined mold supporting platform;

Figure 3 is a longitudinal sectional view of the apparatus shown in Figure 2, the same being shown in a reversed position and with a dotted outline of a frozen confectionery mold shown in discharge position thereon; the submerged position of the inner tank with the frozen confectionery mold supported on its inclined platform is also shown in dotted lines to illustrate the operation of the apparatus;

Figure 4 is a cross-sectional view of the apparatus shown in Figure 3, the same having been taken substantially along the line 4—4 thereof, looking in the direction of the arrows;

Figure 5 is a top plan view of the apparatus shown in Figure 3; and

Figure 6 is a modified form of apparatus made in accordance with the principles of the invention, wherein the mold discharge is sidewise instead of endwise as in Figures 1 to 5.

Referring now to the drawing, and particularly to Figure 1 thereof, there is shown a defrosting apparatus made in accordance with the invention comprising, in combination, an outer stationary tank 10 adapted to hold a quantity of defrosting liquid 11 and an inner tank 12 floating in said liquid having an inclined platform 13 for receiving a conventional frozen confectionery mold 14, and being provided with suitable spaced manipulating handles 15. The mold 14 is shown filled with a plurality of individual frozen confectionery products secured by means of their respective handle members 17 in a conventional stickholder 18, by which they may be collectively withdrawn from the mold 14 when the freezing bond has been melted by the heat of the defrosting liquid 11 contained in the outer tank 10 during the period the lower portion of the mold 14 is submerged therein.

The large outer tank 10 is made of stainless steel or other suitable material, which is supported by a plurality of legs 21, whose lower ends are threaded, as indicated at 22. Enlarged base members or shoes 23, which have been correspondingly threaded internally, are adapted to be mounted on the threads 22 of the legs 21. In this manner the base members 23 are adjustable to provide a suitable and convenient means for leveling the apparatus when the same is installed.

Referring now to Figure 3, the outer tank 10 is subdivided into a relatively large liquid containing chamber 24 and a relatively small liquid receiving chamber 26 by means of a suitable division plate or baffle 27 welded or otherwise mounted therein adjacent one end in a liquid tight manner. The baffle 27 is provided with a series of spaced apertures or overflow ports 28, which define the normal liquid level in the large chamber 24. A cleanout or drain port 29 is provided in the bottom of the liquid containing chamber 24, which is normally closed by a conventional plug 31. An inlet port 32 is also provided for the liquid containing chamber 24 through which heated liquid 33 can be introduced into the chamber 24 to replenish the contents or maintain the same at a proper defrosting temperature. The small chamber 26 is provided with a suitable drain or outlet port 33 through which the overflow liquid from the large chamber 24 passing through the ports 28 of the baffle 27 may be removed. The small chamber 26 should normally be empty of liquid so as to provide a sufficient capacity to receive the excessively large volume of overflow when the inner tank 12 is submerged in the liquid 11 in the outer tank 10.

The inner tank 12 is also made of stainless steel or other suitable material, and is adapted to be floated in the liquid 11 contained in the large chamber 24 of the outer tank 10. The inner tank 12 is provided on its top side 36 with an opening 37, having a removable plug 38 of conventional construction. The opening 37 provides means for inserting a liquid, sand or other heavy material into the tank 12 in order to regulate its buoyancy so as to make the same easily submergible with a small amount of downward pressure when desired.

Flanges 41 formed integrally with the sides of the inner tank 12 project upwardly therefrom, and have their upper ends inclined longitudinally with respect to the top 36, providing suitable transversely spaced supports for mounting bearing blocks 42 for receiving a series of longitudinally spaced conveyor rollers 43 for forming a suitable inclined mold supporting platform 13 for receiving the frozen confectionery mold 14. The flanges 41 are provided with a series of spaced apertures, as indicated at 44, adjacent the top 36 of the inner tank 12 so as to permit any entrapped defrosting liquid 11 thereon to flow off as the tank emerges therefrom after being immersed. Flanges 46 are formed integrally with the ends of the inner tank 12 and project upwardly therefrom to the height of the adjacent ends of the side flanges 41, thereby forming additional support for the inclined mold receiving platform 13. The end flanges 46 are each provided with an elongated opening 47 to permit any entrapped liquid 11 to quickly drain off the top of the tank 12 as the same emerges therefrom.

Referring now to Figure 5, the flanges 41 of the inner tank 12 are each provided with a suitable laterally extending fixed stud 49 adjacent their low ends, which provide means for connecting the inner tank 12 pivotally to the sides of the large chamber 24 of the outer tank 10. The pivot studs are mounted in vertical guiderails 51 of channel shape, which in turn are fixedly secured to the inner sides of the chamber 24. The upper ends of the guiderails 51 are provided with a series of vertically spaced apertures, as indicated at 52, to receive a stop bolt 53, which in turn is provided with a conventional cotter-pin 54 to prevent the same from dropping out. This construction permits vertical adjustment of the floating tank 12 on the guiderails 51, which, in turn, will control the angle of inclination of the inclined supporting platform 13, and also permits easy removal of the inner tank 12 at any time for any purpose whatsoever. A second pair of studs 55, similar to the studs 49, are likewise mounted on the side flanges 41 adjacent their opposite ends. Suitable angle iron brackets or stops 56 are fixedly secured in any suitable manner to the inner surfaces of the chamber 24 above the normal liquid level thereof to provide cooperating means for limiting the upward movement of the floating inner tank 12. The stops 56 and the bolts 52 provide spaced means for holding the inner tank 12 normally in a horizontal position in the liquid 11 contained in the chamber 24 of the outer tank 10. Obviously, the stops 56 are not essential, but preferable since they keep the inner tank 12 horizontal in the defrosting liquid and prevent its lower free edge from bumping the baffle plate 27 as it swings upwardly from its submerged position, which is shown in dotted lines in Figure 3.

The modified construction shown in Figure 6 provides a side discharge of the empty molds instead of an end discharge, and except for such a difference it is identical in construction with the apparatus shown in Figures 1 to 5. These different constructions are essential because in many frozen confectionery plants today a conveyor system is employed for transporting the molds from one operation to another, and every piece of equipment used in such an operation must be constructed to fit both an end and side delivery of the molds on such conveyor systems.

In operation of the apparatus, an operator receives the molds 14 either directly from the refrigerating brine tank or from a conveyor (not shown) filled with the confectionery products firmly frozen to the inner surfaces of its mold cavities. These confections are also collectively secured together by means of their handle members 17 through the medium of the portable stickholder 18. The operator manually places the mold 14 and frozen contents on the rollers 43 forming the inclined supporting platform, while holding the mold 14 and stickholder 18 by means of their contiguous handles. A slight downward pressure will cause the delicately balanced and buoyant inner tank 12 to pivot or swing on its fixed studs 49 into substantially a horizontal position at approximately the level of the liquid 11, and further downward pressure will cause the inner tank 12 and its supported mold 14 to submerge, the studs 49 sliding vertically downwardly during the submerging period in their respective guiderails 51. The defrosting liquid 11 in the chamber 24 of the tank 10 is hot, and therefore only a momentary submergence of the lower portion of the mold 14 is required to release the frozen confectionery bodies therefrom. Thereupon, the operator lifts out the confections collectively by means of the handles of the stickholder 18. The empty mold 14, which has been left supported by the rollers 43 in a submerged position, now is automatically raised upwardly out of the defrosting liquid 11 by reason of the buoyancy of the inner tank 12, which in the absence of pressure returns to its normal raised and inclined position, whereupon the action of gravity causes the rollers 43 to discharge the empty mold. The inclined supporting platform 13 of the inner tank 12 is immediately ready to receive another mold for defrosting purposes. Thus, it will be apparent that the empty molds are not permitted to remain floating in the warm defrosting liquid 11 until the operator can get around to removing the same after disposing of the stickholder 18 and its depending confections, but that the apparatus will automatically remove quickly and efficiently such empty molds without any assistance from the operator, who is free to pick up immediately another mold for defrosting purposes. Obviously, such apparatus considerably increases the capacity of the defrosting operation, which is one of the present day bottlenecks in an automatic system; prevents undue heating of the molds, which normally are filled immediately after defrosting and returned to the refrigerating brine, thus effecting a considerable saving in refrigeration; and delivers the mold to be defrosted into the defrosting liquid in substantially a horizontal position so that only that portion thereof requiring defrosting is heated upon submergence.

While no specific method of heating the defrosting liquid 11 is shown in the drawing, there are several conventional methods now used in the industry and any one of them may be applied to the heating of the defrosting liquid in the present apparatus, viz: (1) a gas or electric heater may be mounted under the chamber 24 of the tank 10; (2) a circulating system of heated liquid may be provided from an outside source of supply through the inlet port 32 and the outlet port 33; and (3) if the chamber 24 of the tank 10 is filled with a liquid, such as water, steam may be introduced through the inlet port 32 to effectively heat the same. The steam will condense in the defrosting liquid, and the excess liquid in the chamber 24 will be ejected through the overflow ports 28 of the baffle 27 into the small chamber 26 and removed therefrom through the outlet or drain port 33.

Although I have only described in detail two embodiments of the invention, it will be readily apparent to those skilled in the art that many further modifications may be made therein without departing from the spirit thereof or from the scope of the appended claims.

What I claim is:

1. Apparatus of the character described comprising, in combination, a stationary outer tank adapted to hold a quantity of liquid and a movable inner tank adapted to float in the liquid of said outer tank, said inner tank having a supporting platform projecting normally above the liquid provided with a series of rollers adapted to support a mold, said inner tank having means projecting from opposite sides adapted to operate in vertical guideways mounted on the inner sides of said outer tank whereby when pressure is exerted on the mold positioned on said platform said platform will be submerged in the liquid in a horizontal position.

2. Apparatus of the character described comprising, in combination, a stationary outer tank adapted to hold a quantity of liquid and a movable inner tank adapted to float in the liquid of said outer tank, said inner tank having an inclined supporting platform provided with a series of rollers adapted to support a mold normally above said liquid and gravitationally discharge the same automatically therefrom when released, said inner tank having means projecting from opposite sides adjacent one end adapted to operate in spaced vertical guideways secured on the inner sides of said outer tank whereby said inner tank is mounted pivotally and slidable vertically with respect to said outer tank so that when pressure is exerted on the mold positioned on said inclined platform the same will swing into substantially a horizontal position before the lower portion of the mold becomes submerged in said liquid.

3. Apparatus of the character described comprising, in combination, a stationary outer tank adapted to hold a quantity of liquid and a movable inner tank adapted to float in the liquid of said outer tank, said inner tank having an inclined supporting platform provided with a series of rollers adapted to support a mold above the top of said outer tank and gravitationally discharge the same therefrom when released, said inner tank having means for pivotally connecting it with cooperating means on said outer tank, said means being mounted adjacent one end of said tanks above the normal liquid level, and a second cooperating means spaced from said pivotally cooperating means for limiting the upward movement of the opposite end of said inner tank.

4. Apparatus of the character described comprising a stationary outer tank subdivided by means of an overflow baffle into a relatively large chamber adapted to hold a quantity of liquid and a relatively small chamber providing a reservoir for catching the overflow from said large chamber, means connecting said large chamber to a source of liquid supply, means for connecting said small chamber to a waste drain, an inner tank adapted to float in said liquid in said large chamber having an inclined supporting platform provided with a series of rollers adapted to support a mold above the liquid level and gravitationally discharge the same therefrom when the mold is released, means for connecting one side of said inner tank pivotally to one side of the large chamber of said stationary tank whereby when pressure is exerted on the mold positioned on said inclined platform the same will swing substantially into a horizontal position before the bottom of the mold becomes submerged in said liquid.

5. Apparatus of the character described comprising, in combination, a stationary outer tank adapted to hold a quantity of liquid and a floating inner tank having an inclined supporting platform projecting above the liquid level of said outer tank, means projecting outwardly from opposite sides of said inner tank cooperating with means projecting inwardly from the inner sides of said outer tank for pivotally connecting said tanks together, and means for adjusting at least one of said cooperating means to vertically adjust said inner tank with respect of said outer tank.

6. Apparatus of the character described comprising, in combination, a stationary outer tank adapted to hold a quantity of liquid and a floating inner tank having an inclined supporting platform projecting above the liquid level of said outer tank, means projecting from opposite sides of said inner tank adapted to operate in vertical guideways mounted on the inner sides of said outer tank whereby when pressure is exerted on the platform of the inner tank it will move substantially into a horizontal position before becoming submerged in said liquid, and means for providing vertical adjustment of said inner tank on said guide rails.

AARON FRIEDMAN.

REFERENCES CITED

The following references are of record in the file of this patent:

UNITED STATES PATENTS

| Number | Name | Date |
|---|---|---|
| 439,072 | Jones | Oct. 21, 1890 |
| 1,477,068 | Magann | Dec. 11, 1923 |
| 1,775,254 | Phelps | Sept. 9, 1930 |
| 1,812,291 | Gosch | June 30, 1931 |
| 2,374,535 | Gibson | Apr. 24, 1945 |